United States Patent
Damnjanovic et al.

(10) Patent No.: US 10,327,178 B2
(45) Date of Patent: Jun. 18, 2019

(54) RADIO RESOURCE MANAGEMENT PROCEDURES FOR NEW RADIO

(71) Applicant: QUALCOMM Incorporated, San Diego, CA (US)

(72) Inventors: Aleksandar Damnjanovic, Del Mar, CA (US); Juan Montojo, San Diego, CA (US); Yisheng Xue, San Diego, CA (US); Ahmed Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/804,706

(22) Filed: Nov. 6, 2017

(65) Prior Publication Data

US 2018/0139657 A1 May 17, 2018

Related U.S. Application Data

(60) Provisional application No. 62/421,061, filed on Nov. 11, 2016.

(51) Int. Cl.
*H04W 28/26* (2009.01)
*H04L 1/00* (2006.01)
(Continued)

(52) U.S. Cl.
CPC .......... *H04W 28/26* (2013.01); *H04L 1/0079* (2013.01); *H04L 47/72* (2013.01); *H04W 28/02* (2013.01);
(Continued)

(58) Field of Classification Search
None
See application file for complete search history.

(56) References Cited

U.S. PATENT DOCUMENTS 6,404,756 B1    6/2002   Whitehill et al.
7,154,875 B2 *  12/2006  Masui .................. H04B 7/2637
                                                       370/342
(Continued)

OTHER PUBLICATIONS

General Dynamics Broadband UK: "Simulation Results for D2D Voice Services Using a Connectionless Approach", 3GPP Draft; R2-140572 Simulation Results for D2D Voice Services Using a Connectionless Approach, 3rd Generation Partnership Project (3GPP), Mobile Competence Centre; 650, Route Des Lucioles; F-06921; vol. RAN WG2, No. Prague, Czech Republic; Feb. 10, 2014-Feb. 14, 2014; Feb. 9, 2014 (Feb. 9, 2014), XP050791899, 6 pages, Retrieved from the Internet: URL:http://www.3gpp.org/ftp/Meetings_3GPP_SYNC/RAN2/Docs/ [retrieved on Feb. 9, 2014].

(Continued)

*Primary Examiner* — Kouroush Mohebbi
(74) *Attorney, Agent, or Firm* — Liem T. Do

(57) ABSTRACT

The present disclosure provides for fast radio resource management procedures for new radio. Generally, a fixed frame structure is utilized and all base stations are synchronized. A base station may transmit a reservation request during a first control slot for the base station in a reservation channel at a beginning of a synchronized frame. A first user equipment may transmit and the base station may receive a reservation response during a second control slot. The base station may receive, from the first UE, after a third control slot of the reservation channel for a neighboring base station, a reservation indication based on a measurement by the first UE of the neighboring base station or at least one other UE associated with the neighboring base station. The base station may determine, based on the resource indication, whether to schedule the first UE during a data channel of the synchronized frame.

30 Claims, 7 Drawing Sheets

(51) Int. Cl.
*H04L 12/911* (2013.01)
*H04W 28/02* (2009.01)
*H04W 72/04* (2009.01)
*H04W 74/08* (2009.01)

(52) U.S. Cl.
CPC ....... *H04W 28/0247* (2013.01); *H04W 72/04* (2013.01); *H04W 74/0891* (2013.01)

(56) References Cited

U.S. PATENT DOCUMENTS

| | | | |
|---|---|---|---|
| 2005/0141464 A1* | 6/2005 | Willey | H04W 68/00 370/337 |
| 2008/0008126 A1* | 1/2008 | Shirakabe | H04B 7/2615 370/329 |

OTHER PUBLICATIONS

International Search Report and Written Opinion—PCT/US2017/060381—ISA/EPO—dated Feb. 7, 2018.

\* cited by examiner

RADIO RESOURCE MANAGEMENT PROCEDURES FOR NEW RADIO

CLAIM OF PRIORITY UNDER 35 U.S.C. § 119

This application claims priority to U.S. Provisional Application No. 62/421,061, titled "RADIO RESOURCE MANAGEMENT PROCEDURES FOR NEW RADIO," filed Nov. 11, 2016, which is assigned to the assignee hereof, and incorporated herein by reference in its entirety.

BACKGROUND

Aspects of this disclosure relate generally to telecommunications, and more particularly to resource management in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

It is envisaged that 5G NR will, in some cases, be deployed in time division duplexing (TDD) bands using very large spectrum (e.g., greater than 100 MHz). Due to the large spectrum, devices may be able to complete transmission of available data relatively quickly. Accordingly, the transmission pattern for 5G NR may be bursty in nature. The bursty transmission pattern allows the user equipment (UE) to more frequently utilize a sleep operation (e.g., discontinuous reception (DRX)) for power savings. The UE may be in a sleep state, then wake up for a short period of time to receive and/or transmit data, then return to the sleep state.

Known communications systems such as long term evolution (LTE) and high-speed packet access (HSPA) use defined frame structures to determine timing of various transmissions. In contrast, wireless local area networks (WLANs), such as IEEE 802.11xx (Wi-Fi), for example, use contention based transmissions without a fixed frame structure.

SUMMARY

The present disclosure provides for fast radio resource management procedures for new radio. Generally, a fixed frame structure is utilized and all base stations are synchronized. Dynamic TDD may be utilized to assign resources for uplink and downlink transmission during the frame. At the beginning of each frame, a reservation channel includes control slots that are protected for each base station to perform a reservation exchange if the base station wants to schedule a UE for either uplink or downlink traffic. Each control slot may include a combination of time and frequency resources. A control slot may be assigned to a single base station and other base stations may refrain from transmitting during the control slot. The neighboring base stations and UEs may listen during the control slots of other base stations to detect which base stations intend to communicate during the frame. After all of the control slots, the UEs may transmit an indication of the reservations detected from neighboring cells. The base station may use the indications, as well as any measurements by the base station, to schedule UEs for dynamic TDD during the frame. The reservation exchange may be repeated at the start of every frame to coordinate transmissions for the frame.

In an aspect, the disclosure provides a method of wireless communications for a base station. The method may include transmitting, by a base station, a reservation request during a first control slot for the base station, the first control slot occurring in a reservation channel at a beginning of a synchronized frame. The method may include receiving a reservation response from a first user equipment (UE) associated with the base station during a second control slot of the reservation channel for the base station. The method may include receiving, after a third control slot of the reservation channel for a neighboring base station, from the first UE, a reservation indication based on a measurement by the first UE of the neighboring base station or at least one other UE associated with the neighboring base station during the third control slot. The method may optionally include determining, based on the resource indication, whether to schedule the first UE during a data channel of the synchronized frame.

In another aspect, the disclosure provides a base station for wireless communications. The base station may include a transceiver, a memory, and a processor communicatively coupled with the transceiver and the memory. The processor and the memory may be configured to transmit a reservation request during a first control slot for the base station, the first control slot occurring in a reservation channel at a beginning of a synchronized frame. The processor and the memory may be configured to receive a reservation response from a first user equipment (UE) associated with the base station during a second control slot of the reservation channel for the base station. The processor and the memory may be configured to receive, from the first UE, after a third control slot of the reservation channel for a neighboring base station, a reservation indication based on a measurement by the first UE of the neighboring base station or at least one other UE associated with the neighboring base station during the third control slot.

In another aspect, the disclosure provides another base station for wireless communications. The base station may include means for transmitting a reservation request during a first control slot for the base station, the first control slot occurring in a reservation channel at a beginning of a synchronized frame. The base station may include means for receiving a reservation response from a first user equipment (UE) associated with the base station during a second control slot of the reservation channel for the base station. The base station may include means for receiving, from the first UE, after a third control slot of the reservation channel for a neighboring base station, a reservation indication based on a measurement by the first UE of the neighboring base station or at least one other UE associated with the neighboring base station during the third control slot.

In another aspect, the disclosure provides a computer readable medium storing computer executable code for wireless communications by a base station. The computer readable medium may include code for transmitting a reservation request during a first control slot for the base station, the first control slot occurring in a reservation channel at a beginning of a synchronized frame. The computer readable medium may include code for receiving a reservation response from a first user equipment (UE) associated with the base station during a second control slot of the reservation channel for the base station. The computer readable medium may include code for receiving, from the first UE, after a third control slot of the reservation channel for a neighboring base station, a reservation indication based on a measurement by the first UE of the neighboring base station or at least one other UE associated with the neighboring base station during the third control slot.

In another aspect, the disclosure provides a method of wireless communications for a UE. The method may include receiving a reservation request, at the UE, during a first control slot for a base station associated with the UE, the first control slot occurring in a reservation channel at a beginning of a synchronized frame. The method may include transmitting a reservation response, by the UE, during a second control slot of the reservation channel for the base station. The method may include detecting, by the UE, during a third control slot of the reservation channel for a neighboring base station, a reservation request transmitted by a neighboring base station or a reservation response transmitted by at least one other UE associated with the neighboring base station. The method may include transmitting, by the UE, an indication of the detected reservation request or reservation response to the base station associated with the UE during a common slot.

In an aspect, the disclosure provides a user equipment (UE) for wireless communications. The UE may include a transceiver, a memory, and a processor communicatively coupled with the transceiver and the memory. The processor and the memory may be configured to receive a reservation request at the UE during a first control slot for a base station associated with the UE, the first control slot occurring in a reservation channel at a beginning of a synchronized frame. The processor and the memory may be configured to transmit a reservation response, from the UE, during a second control slot of the reservation channel for the base station. The processor and the memory may be configured to detect, during a third control slot of the reservation channel for a neighboring base station, a reservation request transmitted by a neighboring base station or a reservation response transmitted by at least one other UE associated with the neighboring base station. The processor and the memory may be configured to transmit an indication of the detected reservation request or reservation response to the base station associated with the UE during a common slot.

In an aspect, the disclosure provides another UE for wireless communications. The UE may include means for receiving a reservation request at the UE during a first control slot for a base station associated with the UE, the first control slot occurring in a reservation channel at a beginning of a synchronized frame. The UE may include means for transmitting a reservation response, from the UE, during a second control slot of the reservation channel for the base station. The UE may include means for detecting, during a third control slot of the reservation channel for a neighboring base station, a reservation request transmitted by the neighboring base station or a reservation response transmitted by at least one other UE associated with the neighboring base station. The UE may include means for transmitting an indication of the detected reservation request or reservation response to the base station associated with the UE during a common slot.

In an aspect, the disclosure provides a computer readable medium storing computer executable code for wireless communications by a UE. The computer readable medium may include code for receiving a reservation request at the UE during a first control slot for a base station associated with the UE, the first control slot occurring in a reservation channel at a beginning of a synchronized frame. The computer readable medium may include code for transmitting a reservation response, by the UE, during a second control slot of the reservation channel for the base station. The computer readable medium may include code for detecting, during a third control slot of the reservation channel for a neighboring base station, a reservation request transmitted by the neighboring base station or a reservation response transmitted by at least one other UE associated with the neighboring base station. The computer readable medium may include code for transmitting an indication of the detected reservation request or reservation response to the base station associated with the UE during a common slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
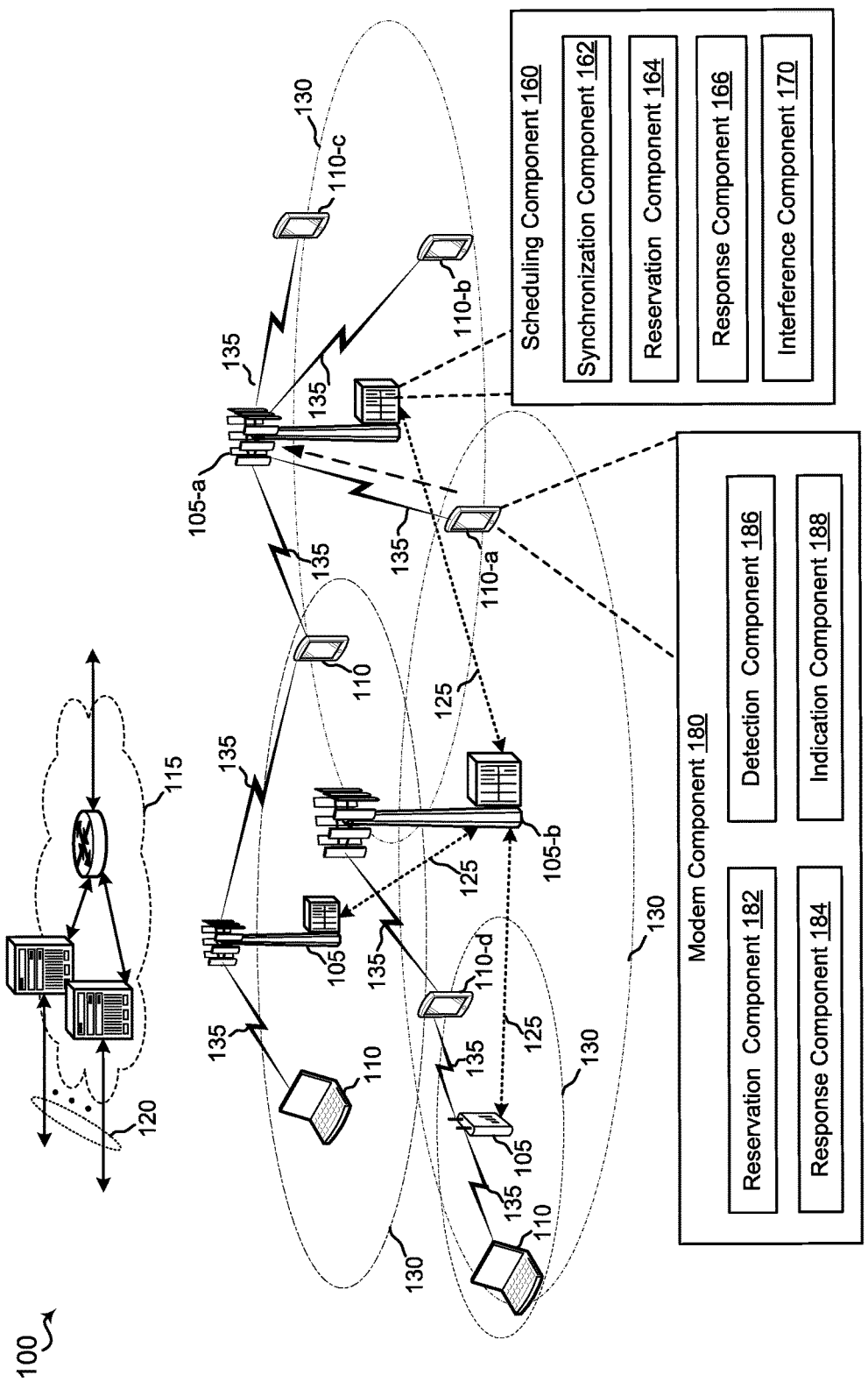
FIG. 1 is a schematic diagram of an example of a wireless communication network in accordance with an embodiment.

As discussed above, emerging 5G or NR communications technology, may employ large spectrum and have a bursty transmission pattern. In a case where a network operator has a portion of licensed spectrum and utilizes a fixed frame structure, coordination among multiple base stations may prevent inter cell interference and enhance resource efficiency. In particular, in a TDD system, one cell may schedule downlink transmissions while a neighboring cell schedules uplink transmissions. The base station receiving the uplink transmissions may receive interference from the downlink transmission of the neighbor cell. The UEs receiving downlink transmissions may also experience interference from neighboring UEs.

The present disclosure provides for fast radio resource management procedures for new radio. Generally, a fixed frame structure is utilized and at least a group of base stations in the network are synchronized. Dynamic TDD may be utilized to assign resources for uplink and downlink transmission during the frame. At the beginning of each frame, a reservation channel includes control slots that are protected for each base station to perform a reservation exchange if the base station wants to schedule a UE for either uplink or downlink traffic. Each control slot may be a combination of time and frequency resources. A control slot may be assigned to a single base station and other base stations in the group may refrain from transmitting in the control slot. The neighboring base stations and UEs may listen during the control slots of other base stations to detect which base stations intend to communicate during the frame. After all of the control slots, the UEs may transmit an indication of the reservations detected from neighboring cells. The base station may use the indications, as well as any measurements by the base station, to schedule UEs during the frame. The reservation exchange may be repeated at the start of every frame to coordinate transmissions for the frame.

Various aspects are now described in more detail with reference to the FIGS. 1-7. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one base station 105 (e.g., base station 105-a) having a scheduling component 160 configured to perform one or more techniques described herein. The base station 105-a may communicate with a user equipment (UE) 110 (e.g., UE 110-a), which may include a modem component 180 configured to perform complementary techniques described herein at the UE 110-a. For example, the base station 105-a may transmit reservation requests and the UE 110-a may transmit reservation responses and reservation indications in order to schedule transmissions to or from the UE 110-a during a data channel portion of a synchronized frame. The wireless communication network 100 may include additional base stations 105 and UEs 110, which may each include a scheduling component 160 or modem component 180, respectively.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a gNodeB (gNB), transmit/receive point (TRP), base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) technology or MuLTEfire technology, a Wi-Fi technology, a Bluetooth technology, or any other long or short range wireless communication technology. Moreover, the wireless communication network 100 may support high frequency operations such as millimeter wave communications. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a larger geographic area than a pico cell or femto cell (e.g., a public building) and provide restricted access and/or unrestricted access by the UEs having an association with the micro cell. An eNB for a macro cell may be referred to as a macro eNB. An eNB for a small cell may be referred to as a small cell eNB, a pico eNB, a femto eNB, micro eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources).

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and access points (AP) may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

In an aspect, scheduling component 160 may include a synchronization component 162 configured to synchronize the base station 105-a with neighbor base stations 105 and UEs 110. The synchronization component 162, for example, may include hardware, firmware, and/or software code executable by a processor for synchronizing the base station 105-a with neighbor base stations 105 and UEs 110. For example, the synchronization component 162 may receive a synchronization information from the core network 115. The synchronization component 162 may broadcast a synchronization signal for the UEs 110 to synchronize with the base station 105-a. The synchronization component 162 may also broadcast system information such as slot assignments. Accordingly, each node in the wireless communication network 100 may be able to determine frame and slot boundaries of a synchronized frame as discussed in further detail below.

In an aspect, scheduling component 160 may include a reservation component 164 configured to transmit a reservation request (nrRReq). The reservation component 164 may include hardware, firmware, and/or software code executable by a processor for transmitting, during a first control slot for the base station, a reservation request, the first control slot occurring during a reservation channel at a beginning of a synchronized frame. For example, the hardware may include a radio frequency (RF) transmitter. The reservation request may indicate that the base station 105-a would like to schedule a transmission to or from an associated UE 110-a during the synchronized frame. An associated UE 110 may be any UE (e.g., UE 110-a, 110-b, 110-c) that is being served by the base station 105-a. A UE that is not being served by the base station 105-a may be served by a neighbor base station and may be referred to as a neighbor UE. For example, the base station 105-a may be associated with UE 110-a, UE 110-b, and UE 110-c. The base station 105-b may be associated with UE 110-d. Accordingly, base station 105-b may be a neighbor base station of base station 105-a and UE 110-d may be a neighbor UE for base station 105-b or any of UEs 110-a, 110-b, or 110-c.

The reservation request may be transmitted during a first control slot for the base station 105-a. The control slot may include time and frequency resources assigned to the base station 105-a. The reservation request may be transmitted at a maximum power. The reservation request may include an identifier of one or more UEs (e.g., UEs 110-a, 110-b, or 110-c) to be scheduled during the synchronized frame. In an aspect, the reservation request may indicate a direction for the desired transmission. In another aspect, the reservation component 164 may send a separate reservation request for downlink scheduling and uplink scheduling.

Scheduling component 160 may include a response component 166 configured to receive a reservation response from a UE 110 (e.g., UE 110-a) associated with the base station 105-a. The response component 166 may include hardware, firmware, and/or software code executable by a processor for receiving, during a second control slot of the reservation channel for the base station 105-a, from a first UE 110-a associated with the base station, a reservation response. For example, the hardware may include an RF receiver. The reservation response may be transmitted by the UE 110-a in response to the reservation request. The reservation response may be received during a second control slot assigned to the base station 105-a. In an aspect, the first control slot and the second control slot may be separated in time such that neither the base station 105-a nor the UE 110-a transmits and receives at the same time. If there are multiple UEs associated with the base station 105-a, the reservation responses may be frequency multiplexed (e.g., using OFDMA or SCFDMA) during the same time slot. The reservation response may indicate that the UE 110-a received the reservation request and is prepared to send or receive, as indicated, during the synchronized frame. The reservation response may be transmitted by the UE 110-a using a maximum power. The response component 166 may measure the reservation response to determine a path loss to the UE 110-a.

In some examples of the present disclosure, the scheduling component 160 may include an interference component 170 for managing potential interference with other devices (e.g., base stations 105 and UEs 110). The interference component 170 may include hardware, firmware, and/or software code executable by a processor for receiving, after a third control slot of the reservation channel for a neighboring base station, from the first UE, a reservation indication based on a measurement by the first UE of at least one neighboring base station or at least one other UE associated with the neighboring base station during the third control slot. For example, the hardware may include an RF receiver. The interference component 170 may receive a reservation indication from the UE 110-*a*. The reservation indication may be transmitted by the UE 110-*a*, which is associated with the base station 105-*a*. The UE 110-*a* may measure a reservation request from another base station 105 or measure a reservation response from a UE 110 associated with another base station 105. The measurement may occur during a third control slot that is assigned to the other base station 105. The interference component 170 may also perform measurements at the base station 105-*a* during the third control slot. The interference component 170 may determine potential interference based on the received reservation indications as well as any measurements performed by the base station 105-*a*. For example, the interference component 170 may generate a jamming graph indicating potential interference if the UEs indicated by the reservations are scheduled.

The modem component of the UE 110 may include a reservation component 182 configured to receive a reservation request from a base station 105-*a* associated with the UE 110-*a* (e.g., a serving base station of the UE 110). The reservation component 182, for example, may include hardware, firmware, and/or software code executable by a processor for receiving, at the UE, during a first control slot for a base station associated with the UE, a reservation request, the first control slot occurring during a reservation channel at a beginning of a synchronized frame. The hardware may include, for example, a radio frequency (RF) receiver.

The modem component 180 may include a response component 184 configured to transmit a reservation response to the base station 105-*a* in response to receiving the reservation request. The response component 184 may include hardware, firmware, and/or software code executable by a processor for transmitting, from the UE 110-*a*, during a second control slot of the reservation channel for the base station, a reservation response. For example, the hardware may include an RF transmitter. The response component 184 may be configured with the position of the second selected slot within the reservation channel. The response component 184 may transmit the reservation response with a maximum transmission power.

The modem component 180 may include a detection component 186 configured to detect, during control slots for neighboring base stations, reservation requests transmitted by the neighboring base stations or reservation responses transmitted by other UEs associated with the neighboring base stations. The detection component 186 may include hardware, firmware, and/or software code executable by a processor for detecting, during a third control slot of the reservation channel for a neighboring base station, a reservation request transmitted by a neighboring base station (e.g., base station 105-*b*) or a reservation response transmitted by at least one other UE (e.g., UE 110-*d*) associated with the neighboring base station. For example, the hardware may include an RF receiver. The detection component 186 may be configured to measure the detected reservation requests and reservation responses to determine a received signal strength (RSS).

The modem component 180 may include an indication component 188 configured to transmit a reservation indication based on the detected reservation requests and reservation responses. The indication component 188 may include hardware, firmware, and/or software code executable by a processor for transmitting an indication of the detected reservation request or reservation response to the base station 105-*a* associated with the UE during a common slot.

For example, the hardware may include an RF transmitter. The indication component 188 may generate a reservation indication identifying a device (e.g., a neighbor base station 105 or a neighbor UE 110) that transmitted each detected reservation request and reservation response. The indication component 188 may also include the RSS for each detected reservation request and reservation response in the reservation indication. The UE 110-*a* may transmit the reservation indication during the common slot concurrently with other UEs 110.

Figure 2:
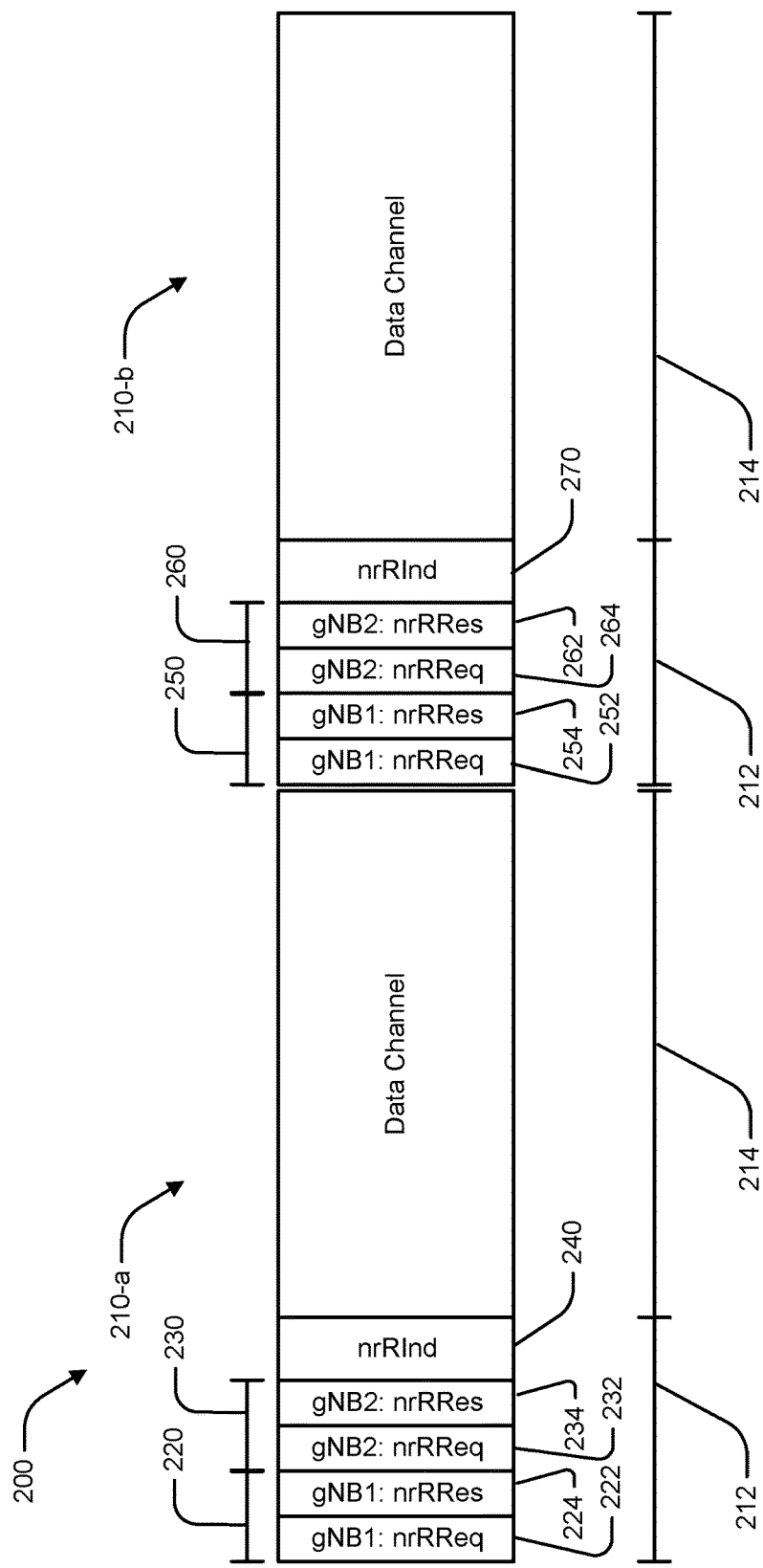
FIG. 2 is conceptual diagram illustrating an example of a frame structure in accordance with an embodiment.

FIG. 2 is a diagram illustrating an example of a frame structure 200 according to an aspect of the disclosure. The frame structure 200 may be a synchronized frame structure followed by each node of the wireless communication network 100. Each frame 210 (e.g., frames 210-*a* and 210-*b*) of the frame structure 200 may include a reservation channel 212 and a data channel 214 defined in the time domain. The reservation channel 212 may occur at a boundary (e.g., at the beginning) of each frame 210. The reservation channel 212 may be used to determine scheduling during the respective frame 210. The data channel 214 may carry control information and data. The reservation channel 212 may be used by nodes of the wireless communication network 100 to access the data channel 214. For example, in an aspect, a base station 105 and/or a UE 110 may only access the data channel 214 by participating in a reservation procedure during the reservation channel 212.

The reservation channel 212 may include resource slots assigned to base stations 105 and their respective associated UEs 110. In an aspect, the resource slots may be separated in time and/or frequency. In order for the base stations 105 to monitor reservations of neighboring base stations, the resource slots assigned to base stations 105 may be separated in time. For example, a first time period 220 of the reservation channel 212 may be assigned to a first gNB (gNB1), which may, for example, correspond to base station 105-*a*. A second time period 230 of the reservation channel 212 may be assigned to a neighboring base station. Additional periods may be included in the frame 210-*a* depending on the number of configured neighbor base stations. The core network 115 may assign time periods 220, 230 to base stations such that no two neighbor base stations are assigned the same time period. The time period 220, 230 assigned to a base station 105 may be further divided into time slots. For example, the time period 220 may include time slots 222 and 224. The time period 230 may include time slots 232 and 234. A reservation request (nrRReq) may be transmitted by the base station 105-*a* in the first time slot 222. The nrRReq may include an identity of the transmitting node such as a signature pre-amble, and an indication of a traffic direction (e.g., DL or UL). The nrRReq may also include an identity of one or more UEs 110 to be scheduled. One or more UEs 110 associated with the first base station 105-*a* may respond to the nrRReq in the second time slot 224 by transmitting a reservation response (nrRRes). The nrRRes may identify the transmitting UE 110 and indicate that the transmitting UE is available for the indicated transmission during the data channel 214. Similar to the time period 220, in the time period 230, the time slot 232 may be a third time slot used by a second base station (gNB2) (e.g., base station 105-*b*) to transmit a reservation request. One or more UEs associated with the base station 105-*b* may transmit a nrRRes in the fourth time slot 234.

It should be appreciated that alternative assignments of resource slots may be used. For example, all of the reservation requests may be transmitted first, followed by the reservation responses. In another aspect, two base stations may use the same time slot if the resource slots are separated by frequency. In this case, the base stations may not be able to measure each other, which may be unnecessary if the base stations are hidden from each other. For example, base station 105-a and base station 105-b may not receive reservation requests from the other base station, but a UE 110-a associated with base station 105-a may detect reservation requests from both base stations.

The reservation channel 212 may also include a reservation indication (nrRInd) 240. The nrRInd 240 may be a common slot for all UEs to transmit an indication of detected reservation requests transmitted by neighbor base stations 105 and reservation responses transmitted by UEs 110 associated with neighbor base stations. All of the UEs may transmit during the nrRInd 240 using frequency division multiplexing. In an aspect, the nrRInd 240 transmitted by each UE 110 may identify each device detected by the UE 110. The nrRInd 240 may also include an indication of a RSS associated with each device detected by the UE 110. In another aspect, the nrRInd 240 may be transmitted, or a device may be identified, only when an RSS satisfies a threshold. Accordingly, the identification of a device in the nrRInd 240 may serve as an indication of the RSS of the device.

In the illustrated example, the first base station 105-a (gNB1) may receive the nrRInd 240 from UE 110-a indicating that the nrRReq from gNB2 (e.g., base station 105-b) was detected in time slot 232 and the nrRRes from UE 110-d was detected in time slot 234. Another UE (e.g., UE 110-b) may not detect any reservations from other base stations and may not transmit nrRInd 240. Conversely, the base station 105-b may receive the nrRInd 240 from UE 110-d indicating that the nrRReq was detected in the time slot 222 from gNB1 and the nrRRes from UE 110-a was detected in the time slot 224. The nrRInd 240 transmitted by each UE 110 and received by each base station 105 may depend on the actual reservation messages and RSS thereof detected at each UE.

The base stations 105-a and 105-b may schedule their respective UEs based on the received nrRInd 240. The base stations 105 may schedule UEs to avoid interference. For example, the base stations 105 may allocate resources of the data channel 214 to separate transmissions involving the UE 110-a in time and/or frequency from transmissions involving the UE 110-d because such transmissions may interfere with each other. The base stations 105 may utilize a pre-determined scheduling algorithm for coordinated scheduling (e.g., based on priority rules) or the base stations 105 may communicate via backhaul links 125 to coordinate scheduling.

The second frame 210-b may have the same structure as the first frame 210-a including assignment of the reservation resource slots to base stations. For example, in a first time period 250, time slot 252 may be assigned to gNB1 for nrRReq and time slot 254 may be assigned to gNB1 for nrRRes and in the second time period 260, time slot 262 may be assigned to gNB2 for nrRReq and time slot 264 may be assigned to gNB2 for nrRRes. In the second frame 210-a, the second base station 105-b may not have any data to transmit and may not expect any data from a UE 110. Accordingly, the second base station 105-b may not transmit a nrRReq in the time slot 264 and any UEs associated with the second base station 105-b may not respond with a nrRRes. The UE 110-a may transmit nrRInd 270 indicating no other reservations, or the UE 110-a may refrain from transmitting the nrRInd 270. Accordingly, in the second data channel 214, the base station 105-a may schedule the UE 110-a without restrictions due to other reservations.

Figure 3:
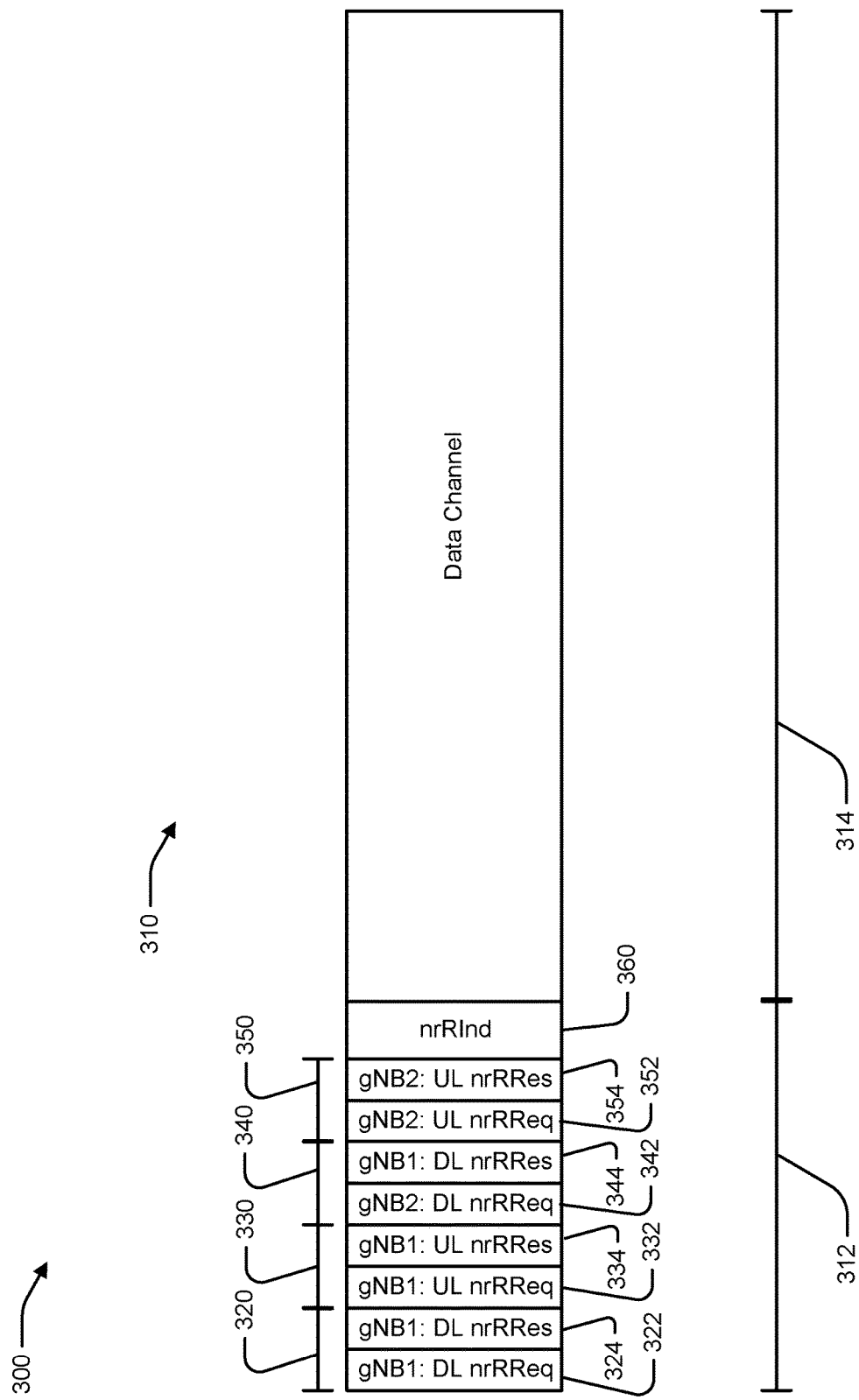
FIG. 3 is conceptual diagram illustrating another example of frame structure in accordance with a second embodiment.

FIG. 3 is a diagram illustrating another example of a frame structure 300 according to an aspect of the disclosure. The frame structure 300 includes a synchronous frame 310. Although only one frame 310 is shown, the frame structure 300 may repeat frames 310. The frame 310 includes a reservation channel 312 and a data channel 314. The reservation channel 312 may be used to determine scheduling during the frame 310. The data channel 314 may carry control information and data.

The reservation channel 312 may include resource slots assigned to base stations 105 and their respective associated UEs 110. As discussed with respect to FIG. 2, the resource slots may be separated in time and/or frequency. Each base station 105 may be assigned a resource slot for downlink reservations and a resource slot for uplink reservations. For example, the gNB1 may be assigned a first time period 320 for DL reservations and a second time period 330 for UL reservations. The time period assigned to a base station 105 for each direction may be further divided into time slots. For example, the time period 320 may include time slots 322 and 324. The time period 330 may include time slots 332 and 334. A nrRReq for downlink traffic may be transmitted by the base station 105-a in the first time slot 322. The nrRReq may include an identity of the transmitting node such as a signature pre-amble. The nrRReq may also include an identity of one or more UEs 110 to be scheduled. The nrRReq may not include or indicate a direction because the direction may be determined by the time slot. One or more UEs 110 associated with the first base station 105-a may respond to the nrRReq in the time slot 324 by transmitting a nrRRes. The nrRRes may identify the transmitting UE 110 and indicate that the transmitting UE is available for a downlink transmission during the data channel 314. In the time period 330, a nrRReq for uplink traffic may be transmitted by the base station 105-a in the time slot 332. One or more UEs 110 associated with the first base station 105-a may respond to the nrRReq in the time slot 324 by transmitting a nrRRes. The nrRRes may identify the transmitting UE 110 and indicate that the transmitting UE is available for an uplink transmission during the data channel 314.

The time period 340 may be assigned to gNB2 and may include a time slot 342 for a nrRReq for downlink traffic and time slot 344 for a nrRRes for uplink traffic. The time period 340 may be assigned to gNB2 and may include a time slot 352 for a nrRReq for uplink traffic and time slot 354 for a nrRRes for uplink traffic. Additional time periods may be included for downlink and uplink reservations for additional base stations.

The frame 310 may also include a nrRInd 360. The nrRInd 360 may be transmitted by each UE 110 that detects a neighbor base station 104 or a UE 110 associated with a neighbor base station 105. According to the aspect illustrated in FIG. 3, the UEs 110 may not need to decode the nrRReq or nrRRes for other base stations. Because both the base station and the direction of the transmission is indicated by the resource slot used for the detected reservations, the UE 110 may only measure the RSS. The UE 110 may still be able generate the nrRInd 360 indicating the source and direction of potentially interfering transmissions.

It should be appreciated that, as discussed with respect to FIG. 2 above, alternative assignments of resource slots may be used. For example, the order of downlink and uplink reservations may be switched. The resource slots may also be separated in the frequency domain as discussed above.

Figure 4:
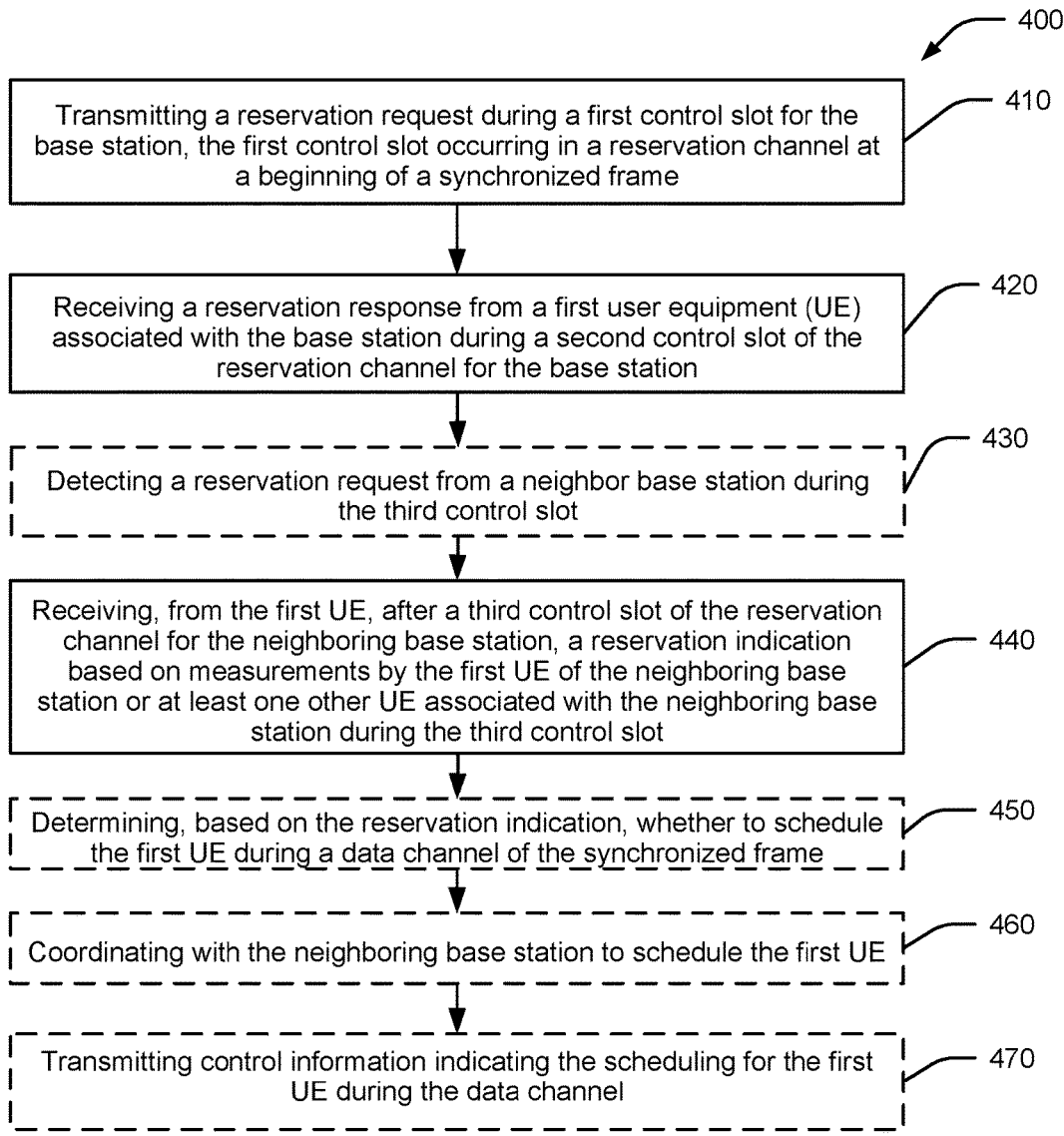
FIG. 4 is a flowchart of an example of a method of one technique for wireless communication by a base station in accordance with an embodiment.

FIG. 4 is a flowchart of an example method 400 of wireless communications in shared spectrum. The method 400 may be performed using an apparatus (e.g., the base station 105-a, for example). Although the method 400 is described below with respect to the elements of a scheduling component 160, other components may be used to implement one or more of the steps described herein. Blocks shown with dashed lines may be optional.

In block 410, the method 400 may include transmitting a reservation request during a first control slot for the base station, the first control slot occurring in a reservation channel at a beginning of a synchronized frame. In an aspect, for example, the reservation component 164 may transmit the reservation request during the first control slot for the base station 105-a. The first control slot (e.g., time slot 222) may occur during the reservation channel 212 at a beginning of a synchronized frame 210. In an aspect, the reservation request may include an indication of whether the reservation request is for a downlink reservation or an uplink reservation. In another aspect, the location of the first control slot may indicate whether the reservation request is for a downlink reservation or for an uplink reservation In block 420, the method 400 may include receiving a reservation response from a first UE associated with the base station during a second control slot of the reservation channel for the base station. In an aspect, for example, the response component 166 may receive the reservation response from the first UE (e.g., UE 110-a) associated with the base station 105-a during the second control slot (e.g., time slot 224) of the reservation channel 212 for the base station. The first control slot and the second control slot may be consecutive slots assigned to the base station.

In block 430, the method 400 may optionally include detecting a reservation request from the neighboring base station during the third control slot. In an aspect, for example, the interference component 170 may detect the reservation request from the neighboring base station (e.g., base station 105-b) during the third control slot (e.g., time slot 232). The interference component 170 may detect the reservation request from the neighboring base station when the first control slot, the second control slot, and the third control slot are separated in time. In an aspect, the first control slot and the third control slot may use different frequencies. For example, the first control slot and the third control slot may be transmitted at the same time using frequency division multiplexing between the neighboring base stations.

In block 440, the method 400 may include receiving, after a third control slot of the reservation channel for the neighboring base station, from the first UE, a reservation indication based on measurements by the first UE of the neighboring base station or at least one other UE associated with the neighboring base station during the third control slot. In an aspect, for example, the interference component 170 may receive, after the third control slot (e.g., time slot 232 or time slot 234) of the reservation channel for the neighboring base station 105-b, from the first UE 110-a, a reservation indication based on measurements by the first UE 110-a of the neighboring base station 105-b or at least one other UE (e.g., UE 110-d) associated with the neighboring base station 105-b during the third control slot (e.g., time slot 232 or time slot 234). In an aspect, the reservation indication is received during a common slot. The reservation indication from the first UE may be received concurrently with reservation indications from other UEs (e.g., UE 110-b and UE 110-c) associated with the base station 105-a during the common slot (e.g., nrRInd 240). In an aspect, the reservation indication includes an indication of a detected signal strength. In another aspect, the reservation indication is transmitted by the first UE if the measurement satisfies a threshold signal strength.

In block 450, the method 400 may optionally include determining, based on the reservation indication, whether to schedule the first UE during a data channel of the synchronized frame. In an aspect, for example, the scheduling component 160 may determine, based on the reservation indication, whether to schedule the first UE 110-a during the data channel 214 of the synchronized frame 210. For example, determining whether to schedule the UE may include generating a jamming graph based on the reservation indication. The jamming graph may be used to determine whether scheduling the UE would result in either the UE being jammed or the transmissions involving the UE jamming another device.

In block 460, the method 400 may optionally include coordinating with the neighboring base station to schedule the UE. In an aspect, for example, the interference component 170 may coordinate with the neighboring base station to schedule the first UE. The coordination may include using a set of predetermined rules implemented by each base station. In another aspect, the coordination may include communicating between the base stations over a backhaul connection.

In block 470, the method 400 may optionally include transmitting control information indicating the scheduling during the data channel. In an aspect, for example, the scheduling component 160 may transmit control information indicating the scheduling for the first UE during the data channel.

Figure 5:
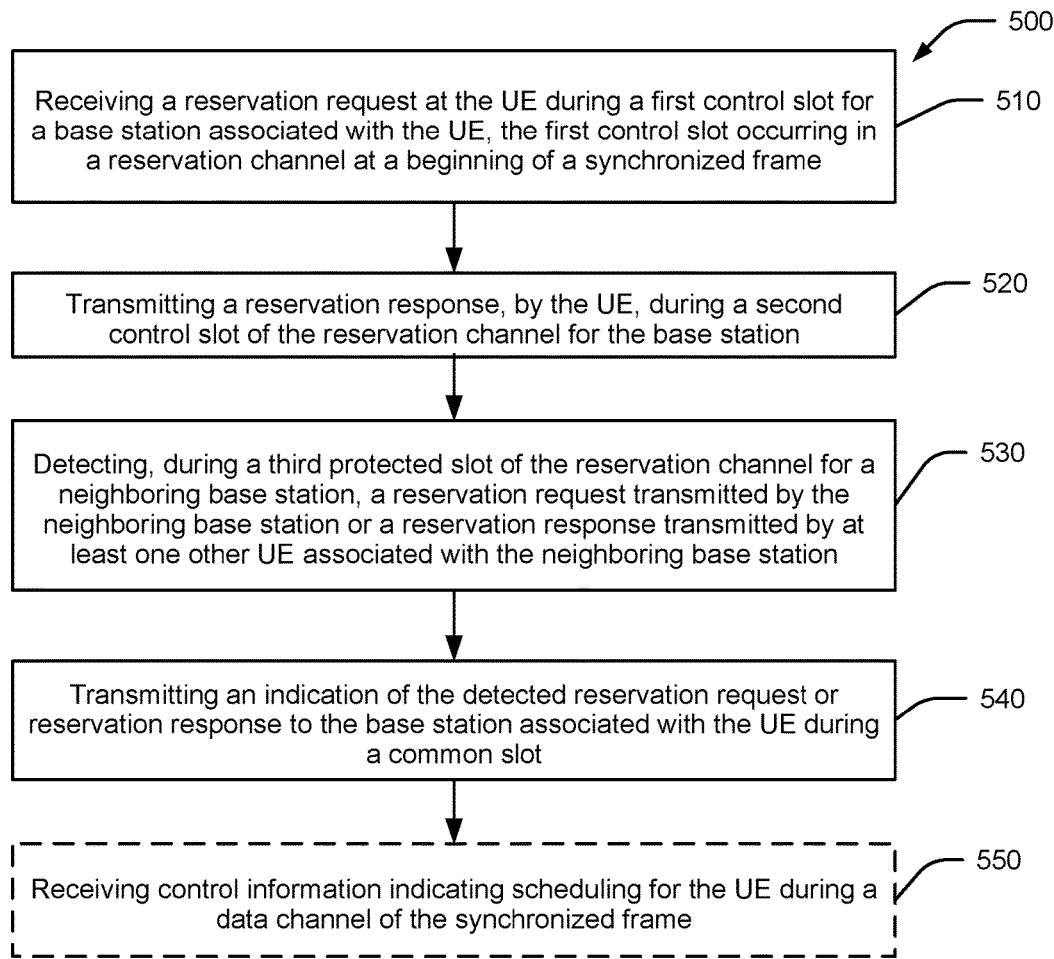
FIG. 5 is a flowchart of an example of a method of another technique for wireless communication by a user equipment in accordance with an embodiment.

FIG. 5 is a flowchart of an example method 500 of wireless communications. The method 500 may be performed using an apparatus (e.g., the UE 110-a, for example). Although the method 500 is described below with respect to the elements of a modem component 180, other components may be used to implement one or more of the steps described herein. In an aspect, the method 500 may include blocks performed by the UE 110 complementing blocks performed by a base station 105 performing the method 400. Blocks shown in dashed lines may be optional.

In block 510, the method 500 may include receiving a reservation request at the UE during a first control slot for a base station associated with the UE, the first control slot occurring in a reservation channel at a beginning of a synchronized frame. In an aspect, for example, the reservation component 182 may receive the reservation request, at the UE 110-a, during a first control slot (e.g., time slot 222) for a base station (e.g., base station 105-a) associated with the UE 110-a. The first time slot 222 may be a control slot that occurs in a reservation channel 212 at a beginning of a synchronized frame 210. In an aspect, the reservation request includes an indication of whether the reservation request is for a downlink reservation or for an uplink reservation.

In block 520, the method 500 may include transmitting a reservation response, by the UE, during a second control slot of the reservation channel for the base station. In an aspect, for example, the response component 184 may transmit the reservation response during the second control slot (e.g., time slot 224) of the reservation channel 212 for the base station 105-a. In an aspect, the first control slot and the second control slot are assigned to one of a downlink reservation or an uplink reservation. The blocks 510 and 520 may be repeated for receiving a second reservation request for the other of the downlink reservation or the uplink reservation in a fourth control time slot and transmitting a second reservation response for the other of the downlink reservation or the uplink reservation in a fifth control time slot.

In block 530, the method 500 may include detecting, during a third control slot of the reservation channel for a neighboring base station, a reservation request transmitted by at least one neighboring base station or a reservation response transmitted by at least one other UE associated with the neighboring base station. In an aspect, for example, the detection component 186 may detect, during a third control slot (e.g., time slot 232 or time slot 234) of the reservation channel 212 for a neighboring base station (e.g., base station 105-*b*), a reservation request transmitted by the neighboring base station or a reservation response transmitted by at least one other UE (e.g., UE 110-*d*) associated with the neighboring base station. In an aspect, the first control slot, the second control slot, and the third control slot are separated in time. In another aspect, the first control slot and the third control slot use different frequencies. For example, the first control slot and the third control slot may be transmitted at the same time using frequency division multiplexing between the neighboring base stations. The UE 110-*a* may concurrently receive the reservation request from the first base station 105-*a* and detect a reservation request from the neighbor base station 105-*b*.

In block 540, the method 500 may include transmitting an indication of the detected reservation request or reservation response to the base station associated with the UE during a common slot. In an aspect, for example, the indication component 188 may transmit the indication of the detected reservation request or reservation response to the base station 105-*a* associated with the UE 110-*a* during the common slot (e.g., nrRInd 240). In an aspect, the reservation indication includes an indication of a detected signal strength. In another aspect, transmitting the reservation indication includes determining that a signal strength of the reservation request or the reservation response satisfies a threshold signal strength.

In block 550, the method 500 may optionally include receiving control information indicating scheduling for the UE during a data channel of the synchronized frame. In an aspect, for example, the modem component 180 may receive control information indicating scheduling for the UE 110-*a* during the data channel 214 of the synchronized frame 210.

Figure 6:
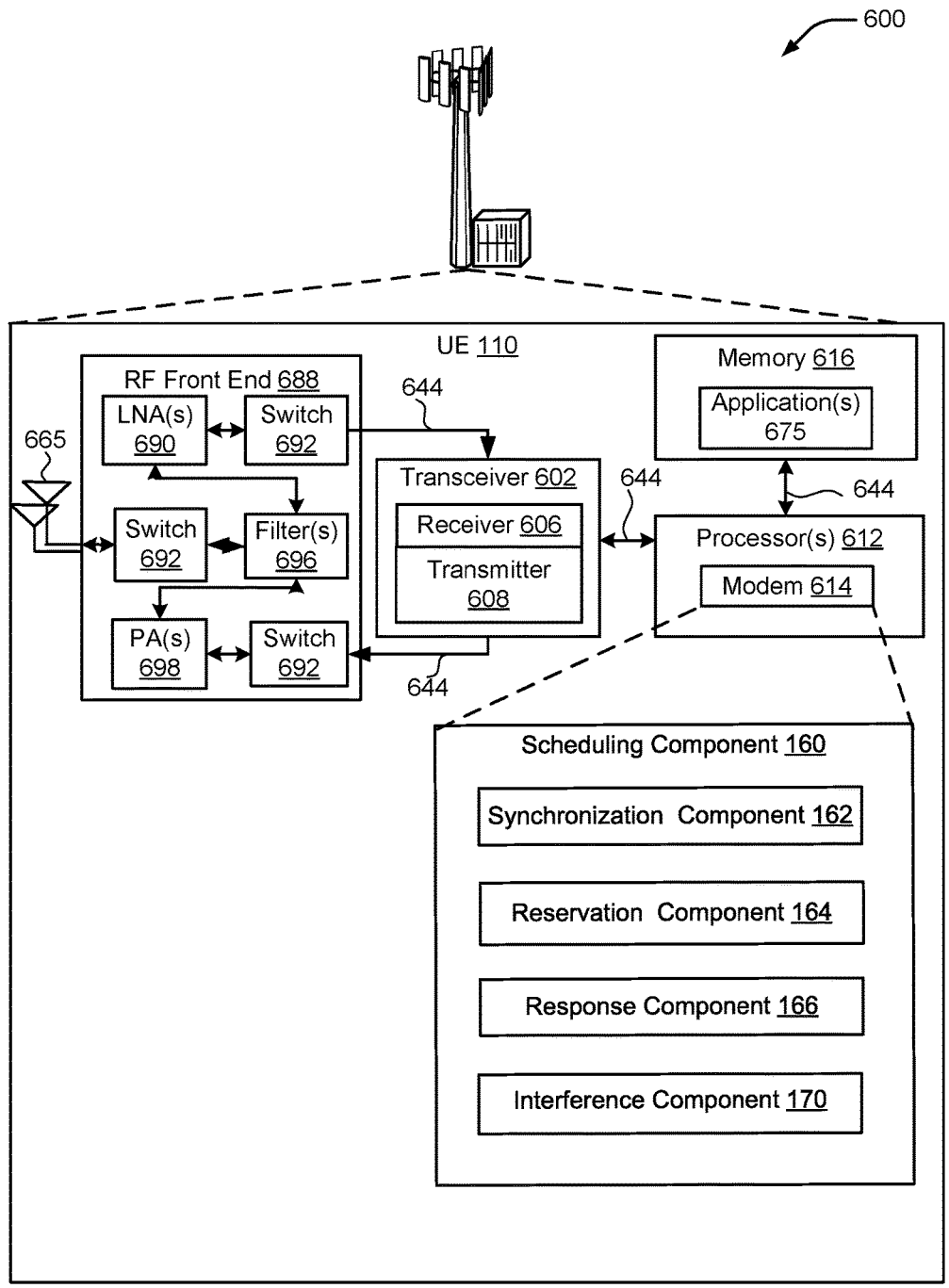
FIG. 6 is a schematic diagram of an aspect of an implementation of various components of a base station configured for communicating with a user equipment, in accordance with an embodiment.

FIG. 6 schematically illustrates hardware components and subcomponents of the base station 105-*a* for implementing one or more methods (e.g., method 400) described herein in accordance with various aspects of the present disclosure. For example, one example of an implementation of base station 105-*a* may include a variety of components, some of which have already been described above, but including components such as one or more processors 612 and memory 616 and transceiver 602 in communication via one or more buses 644, which may operate in conjunction with the scheduling component 160 to enable one or more of the functions described herein related to including one or more methods of the present disclosure. Further, the one or more processors 612, modem 614, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 614 that uses one or more modem processors. The various functions related to scheduling component 160 may be included in modem 614 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with scheduling component 160 may be performed by transceiver 602.

Also, memory 616 may be configured to store data used herein and/or local versions of applications 675 or scheduling component 160 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining scheduling component 160 and/or one or more of its subcomponents, and/or data associated therewith, when base station 105-*a* is operating at least one processor 612 to execute scheduling component 160 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, base station 105-*a* may include RF front end 688, which may operate in communication with one or more antennas 665 and transceiver 602 for receiving and transmitting radio transmissions, for example, wireless communications transmitted by base station 105 or wireless communications transmitted by UE 110. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and a specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and a specified gain value for the particular PA 698 based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA As such, transceiver 602 may be configured to transmit and receive wireless signals through one or more antennas 665 via RF front end 688. In an aspect, transceiver 602 may be tuned to operate at specified frequencies such that base station 105-*a* can communicate with, for example, one or more UEs 110. In another aspect, the transceiver 602 may be tuned to operate at specified frequencies such that base station 105-*a* can detect reservations transmitted by neighboring base stations 105 or one or more cells associated with one or more base stations 105. In an aspect, for example, modem 614 can configure transceiver 602 to operate at a specified frequency and power level based on the base station configuration of the base station 105-*a* and the communication protocol used by modem 614.

In an aspect, modem 614 can be a multiband-multimode modem, which can process digital data and communicate with transceiver 602 such that the digital data is sent and received using transceiver 602. In an aspect, modem 614 can be multiband and be configured to support multiple frequency bands for a specific communications protocol. In an aspect, modem 614 can be multimode and be configured to support multiple operating networks and communications protocols. In an aspect, modem 614 can control one or more components of base station 105-*a* (e.g., RF front end 688, transceiver 602) to enable transmission and/or reception of signals from a UE based on a specified modem configuration. In an aspect, the modem configuration can be based on the mode of the modem and the frequency band in use.

Figure 7:
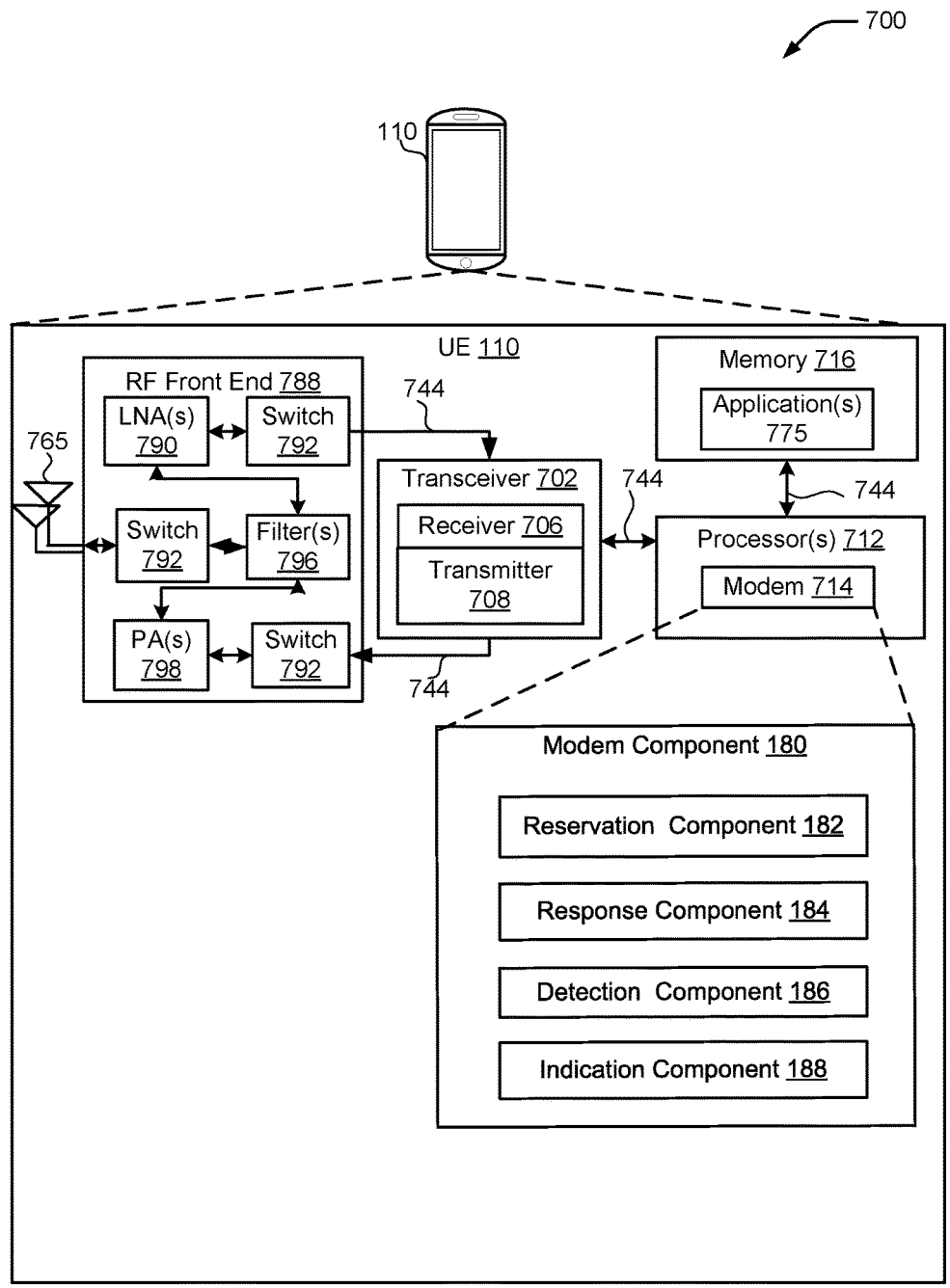
FIG. 7 is a schematic diagram of an aspect of an implementation of various components of the UE configured for communicating with a network entity, such as a base station, in accordance with an embodiment.

FIG. 7 schematically illustrates hardware components and subcomponents of the UE 110 for implementing one or more methods (e.g., method 500) described herein in accordance with various aspects of the present disclosure. For example, one example of an implementation of UE 110 may include a variety of components, some of which have already been described above, but including components such as one or more processors 712 and memory 716 and transceiver 702 in communication via one or more buses 744, which may operate in conjunction with the modem component 180 to enable one or more of the functions described herein related to including one or more methods of the present disclosure. Further, the one or more processors 712, modem 714, memory 716, transceiver 702, RF front end 788 and one or more antennas 765, may be configured to support voice and/or data calls (simultaneously or non-simultaneously) in one or more radio access technologies.

In an aspect, the one or more processors 712 can include a modem 714 that uses one or more modem processors. The various functions related to modem component 180 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with modem component 180 may be performed by transceiver 702.

Also, memory 716 may be configured to store data used herein and/or local versions of applications 775 or modem component 180 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining modem component 180 and/or one or more of its subcomponents, and/or data associated therewith, when UE 110 is operating at least one processor 712 to execute UE modem component 180 and/or one or more of its subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 110 may include RF front end 788, which may operate in communication with one or more antennas 765 and transceiver 702 for receiving and transmitting radio transmissions, for example, wireless communications transmitted by at least one base station 105 or wireless transmissions transmitted by UE 110. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and a specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and a specified gain value for the particular PA 798 based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA As such, transceiver 702 may be configured to transmit and receive wireless signals through one or more antennas 765 via RF front end 788. In an aspect, transceiver may be tuned to operate at specified frequencies such that UE 110 can communicate with, for example, one or more base stations 105 or one or more cells associated with one or more base stations 105. In an aspect, for example, modem 714 can configure transceiver 702 to operate at a specified frequency and power level based on the UE configuration of the UE 110 and the communication protocol used by modem 714.

In an aspect, modem 714 can be a multiband-multimode modem, which can process digital data and communicate with transceiver 702 such that the digital data is sent and received using transceiver 702. In an aspect, modem 714 can be multiband and be configured to support multiple frequency bands for a specific communications protocol. In an aspect, modem 714 can be multimode and be configured to support multiple operating networks and communications protocols. In an aspect, modem 714 can control one or more components of UE 110 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by a base station, comprising:
    transmitting a reservation request during a first control slot for the base station, the first control slot occurring in a reservation channel at a beginning of a synchronized frame;
    receiving a reservation response from a first user equipment (UE) associated with the base station during a second control slot of the reservation channel for the base station; and
    receiving, from the first UE, after a third control slot of the reservation channel for a neighboring base station, a reservation indication based on a measurement by the first UE of the neighboring base station or at least one other UE associated with the neighboring base station during the third control slot.

2. The method of claim 1, further comprising determining, based on the reservation indication, whether to schedule the first UE during a data channel of the synchronized frame.

3. The method of claim 1, wherein the first control slot, the second control slot, and the third control slot are separated in time.

4. The method of claim 3, further comprising detecting a reservation request from the neighboring base station during the third control slot.

5. The method of claim 3, wherein the reservation indication is received during a common slot.

6. The method of claim 1, wherein the first control slot and the second control slot are consecutive slots assigned to the base station.

7. The method of claim 1, wherein the first control slot and the third control slot use different frequencies.

8. The method of claim 1, wherein the reservation indication includes an indication of a detected signal strength.

9. The method of claim 1, wherein the reservation indication is transmitted by the first UE if the measurement satisfies a threshold signal strength.

10. The method of claim 1, wherein the reservation request includes an indication of whether the reservation request is for a downlink reservation or for an uplink reservation.

11. The method of claim 1, wherein the first control slot and the second control slot are assigned to one of a downlink reservation or an uplink reservation, the method further comprising:
    transmitting a second reservation request for the other of the downlink reservation or the uplink reservation in a fourth control slot; and
    receiving a second reservation response for the other of the downlink reservation or the uplink reservation in a fifth control slot.

12. A base station for wireless communications, comprising:
    a transceiver;
    a memory; and
    a processor communicatively coupled with the transceiver and the memory, the processor and the memory configured to:
    transmit a reservation request during a first control slot for the base station, the first control slot occurring in a reservation channel at a beginning of a synchronized frame;
    receive a reservation response from a first user equipment (UE) associated with the base station during a second control slot of the reservation channel for the base station; and
    receive, from the first UE, after a third control slot of the reservation channel for a neighboring base station, a reservation indication based on a measurement by the first UE of the neighboring base station or at least one other UE associated with the neighboring base station during the third control slot.

13. The base station of claim 12, further comprising determining, based on the reservation indication, whether to schedule the first UE during a data channel of the synchronized frame.

14. The base station of claim 12, wherein the first control slot, the second control slot, and the third control slot are separated in time.

15. The base station of claim 14, further comprising detecting a reservation request from the neighboring base station during the third control slot.

16. The base station of claim 12, wherein the first control slot and the second control slot are assigned to one of a downlink reservation or an uplink reservation, wherein the processor and memory are configured to:
    transmit a second reservation request for the other of the downlink reservation or the uplink reservation in a fourth control time slot; and
    receive a second reservation response for the other of the downlink reservation or the uplink reservation in a fifth control time slot.

17. A method of wireless communications for a user equipment (UE), comprising:
    receiving a reservation request at the UE during a first control slot for a base station associated with the UE, the first control slot occurring in a reservation channel at a beginning of a synchronized frame;

transmitting a reservation response, by the UE, during a second control slot of the reservation channel for the base station;

detecting, by the UE, during a third control slot of the reservation channel for a neighboring base station, a reservation request transmitted by the neighboring base station or a reservation response transmitted by at least one other UE associated with the neighboring base station; and transmitting an indication of the detected reservation request or reservation response to the base station associated with the UE during a common slot.

18. The method of claim 17, wherein the first control slot, the second control slot, and the third control slot are separated in time.

19. The method of claim 17, wherein the first control slot and the third control slot use different frequencies.

20. The method of claim 17, wherein the indication includes a detected signal strength.

21. The method of claim 17, wherein transmitting the indication includes determining that a signal strength of the reservation request or the reservation response satisfies a threshold signal strength.

22. The method of claim 17, wherein the reservation request includes an indication of whether the reservation request is for a downlink reservation or for an uplink reservation.

23. The method of claim 17, wherein the first control slot and the second control slot are assigned to one of a downlink reservation or an uplink reservation, the method further comprising:

receiving a second reservation request for the other of the downlink reservation or the uplink reservation in a fourth control time slot; and transmitting a second reservation response for the other of the downlink reservation or the uplink reservation in a fifth control time slot.

24. A user equipment (UE) for wireless communications, comprising:
a transceiver;
a memory; and
a processor communicatively coupled with the transceiver and the memory, the processor and the memory configured to:
receive a reservation request at the UE during a first control slot for a base station associated with the UE, the first control slot occurring in a reservation channel at a beginning of a synchronized frame;
transmit a reservation response, from the UE, during a second control slot of the reservation channel for the base station;
detect, during a third control slot of the reservation channel for a neighboring base station, a reservation request transmitted by the neighboring base station or a reservation response transmitted by at least one other UE associated with the neighboring base station; and
transmit an indication of the detected reservation request or reservation response to the base station associated with the UE during a common slot.

25. The UE of claim 24, wherein the first control slot, the second control slot, and the third control slot are separated in time.

26. The UE of claim 24, wherein the first control slot and the third control slot use different frequencies.

27. The UE of claim 24, wherein the indication includes a detected signal strength.

28. The UE of claim 24, wherein transmitting the indication includes determining that a signal strength of the reservation request or the reservation response satisfies a threshold signal strength.

29. The UE of claim 24, wherein the reservation request includes an indication of whether the reservation request is for a downlink reservation or for an uplink reservation.

30. The UE of claim 24, wherein the first control slot and the second control slot are assigned to one of a downlink reservation or an uplink reservation, further comprising:
receiving a second reservation request for the other of the downlink reservation or the uplink reservation in a fourth control time slot; and
transmitting a second reservation response for the other of the downlink reservation or the uplink reservation in a fifth control time slot.

* * * * *